United States Patent
Urbanek et al.

[11] Patent Number: 6,113,383
[45] Date of Patent: Sep. 5, 2000

[54] INJECTION MOULDING MACHINE

[75] Inventors: Otto Urbanek, Linz; Gerhard Wimbauer, Schwertberg, both of Austria

[73] Assignee: Engel Maschinenbau Gesellschaft m.b.H., Schwertberg, Austria

[21] Appl. No.: 09/043,080
[22] PCT Filed: Jul. 10, 1997
[86] PCT No.: PCT/AT97/00160
§ 371 Date: Mar. 6, 1998
§ 102(e) Date: Mar. 6, 1998
[87] PCT Pub. No.: WO98/02291
PCT Pub. Date: Jan. 22, 1998

[30] Foreign Application Priority Data

Jul. 12, 1996 [EP] European Pat. Off. ............... 96111233

[51] Int. Cl.⁷ .................................................. B29C 45/64
[52] U.S. Cl. ..................... 425/595; 100/231; 100/258 A; 425/451.9
[58] Field of Search .................... 425/589, 595, 425/451.9; 100/231, 258 A

[56] References Cited

U.S. PATENT DOCUMENTS 5,354,196  10/1994  Ziv-Av ..................................... 425/589
5,556,656  9/1996  Lampl et al. ............................ 425/589
5,762,984  6/1998  Wimbauer ................................ 425/589

FOREIGN PATENT DOCUMENTS

| 400022 | 9/1995 | Austria . |
| 0311133 | 12/1994 | European Pat. Off. . |
| 0722820 | 7/1996 | European Pat. Off. . |
| 29516398 U | 1/1996 | Germany . |
| WO96/05041 | 2/1996 | WIPO . |
| 9728946 | 8/1997 | WIPO . |

*Primary Examiner*—James P. Mackey
*Attorney, Agent, or Firm*—Notaro & Michalos P.C.

[57] ABSTRACT

An injection molding machine with a substantially C-shaped machine frame has one leg on which a stationary die platen is mounted and another leg on which a closing mechanism for driving a movable die platen is mounted. An articulated part which comprises a girder extending in the longitudinal direction of the machine is arranged between at least one die platen and the machine frame and is- deformed when a closing force is applied which tips the die platen in relation to the associated leg of the machine frame. The horizontal central axis (8) of the die platen, which is determined by a centering mechanism of the die, extends completely inside the girder (6) and the cross-section of the articulated part (7) increases in size in the same direction, starting from the central girder (6).

4 Claims, 3 Drawing Sheets

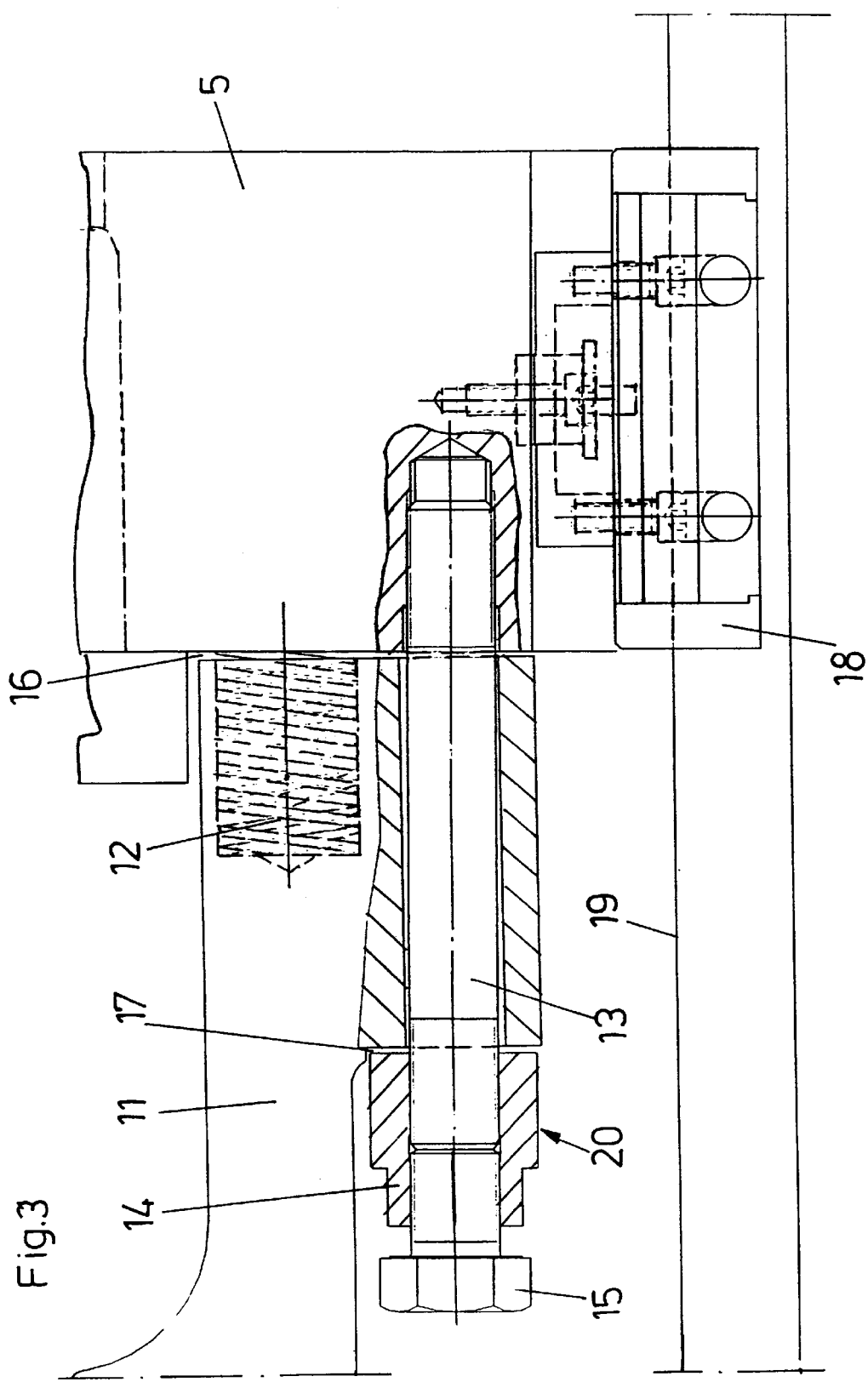

INJECTION MOULDING MACHINE

FIELD AND BACKGROUND OF THE INVENTION

The invention relates to an injection molding machine comprising a substantially C-shaped machine frame, on one limb of which is mounted a stationary mold mounting plate and on the other limb of which is mounted a closing mechanism for driving a movable mold mounting plate, wherein the free ends of the limbs of the machine frame, which are not connected by frame beams, deform under the influence of the closing force which occurs during the closing operation, and wherein arranged between at least one mold mounting plate and the machine frame is a hinge portion which includes a bar portion extending in the longitudinal direction of the machine, which hinge portion is deformed when the closing force is applied whereby the mold mounting plate is tilted relative to the associated limb of the machine frame.

Insofar as injection molding machines without frame beams have been proposed in earlier decades, the attempt has generally been to minimise the deformation of the C-shaped machine frame, which occurs under the influence of the closing force. Machines without frame beams only became of noteworthy practical significance however since designs have changed over to permitting a certain degree of deformation of the machine frame and compensating for that deformation by suitable measures. In that respect it is possible to permit deformation as between each of the two mold mounting plates and the associated limb of the machine frame, which deformation provides precise compensation for the spreading effect in respect of the limbs of the machine frame, so that the mold separation plane does not experience a change in its vertical position when the closing pressure is applied. In that respect the arrangement may be such (see EP 0 722 820 A1) that the upper end of the limb of the machine frame pivots in opposite relationship to the limb itself. In contrast, improved localisation of the pivot axes is achieved i- separate deformable holding portions are fitted between the mold mounting plates and the machine frame, as is shown in DE 295 16 398 U1.

In the case of the beam-less injection molding machine in accordance with EP 0 311 133 B, which in the meantime has become the classic design configuration, it is possible to manage with one pivot axis insofar as the stationary mold mounting plate is rigidly connected to the machine frame and the movable mold mounting plate is mounted tiltably so that it can also perform the pivotal movement that the fixed mold mounting plate experiences under the influence of the closing force. FIGS. 3 through 6 of AT 400 022 B show a corresponding structural configuration corresponding to the definition set forth in the opening part of this specification.

SUMMARY OF THE INVENTION

The known construction disclosed in AT 400 022 B lays the emphasis entirely on the pivotal movement of the movable mold mounting plate under the influence of the closing force. Openings extending over a large part of the cross-section permit compression of the lower part of the bar portion, in that sense. In comparison the invention is based on the consideration that, with the closing pressures necessary for injection molding, it is not the flexing of the bar portion but the aspect of carrying the closing force that represents the actual problem. What is involved is carrying the closing force without the material of the hinge portion suffering plastic deformation while the hinge portion is sufficiently bent by the moment that occurs between the two mold halves to compensate for the movement involving opening of the limbs of the machine frame. That is achieved by virtue of a configuration in which the cross-section of the hinge portion increases continuously starting from the central bar portion. By virtue of that measure, the pivot axis of the movable mold mounting plate is localised in the central region of the hinge portion. In addition the arrangement guarantees the connection to the adjacent parts of the machine which, by virtue of the wider contact surface, can be of lower quality than the hinge portion itself.

The flange-like configuration of the ends of the hinge portion according to the invention makes it possible to form an abutment on one of the flanges in one piece therewith, which abutment limits the pivotal movement of the movable mold mounting plate in one and preferably both directions.

BRIEF DESCRIPTION OF THE DRAWINGS

Details of the invention are described hereinafter with reference to the drawing in which:

FIG. 3 is a view on an enlarged scale of a detail from FIG. 2.

DESCRIPTION OF THE PREFERRED EMBODIMENTS

Figure 1:
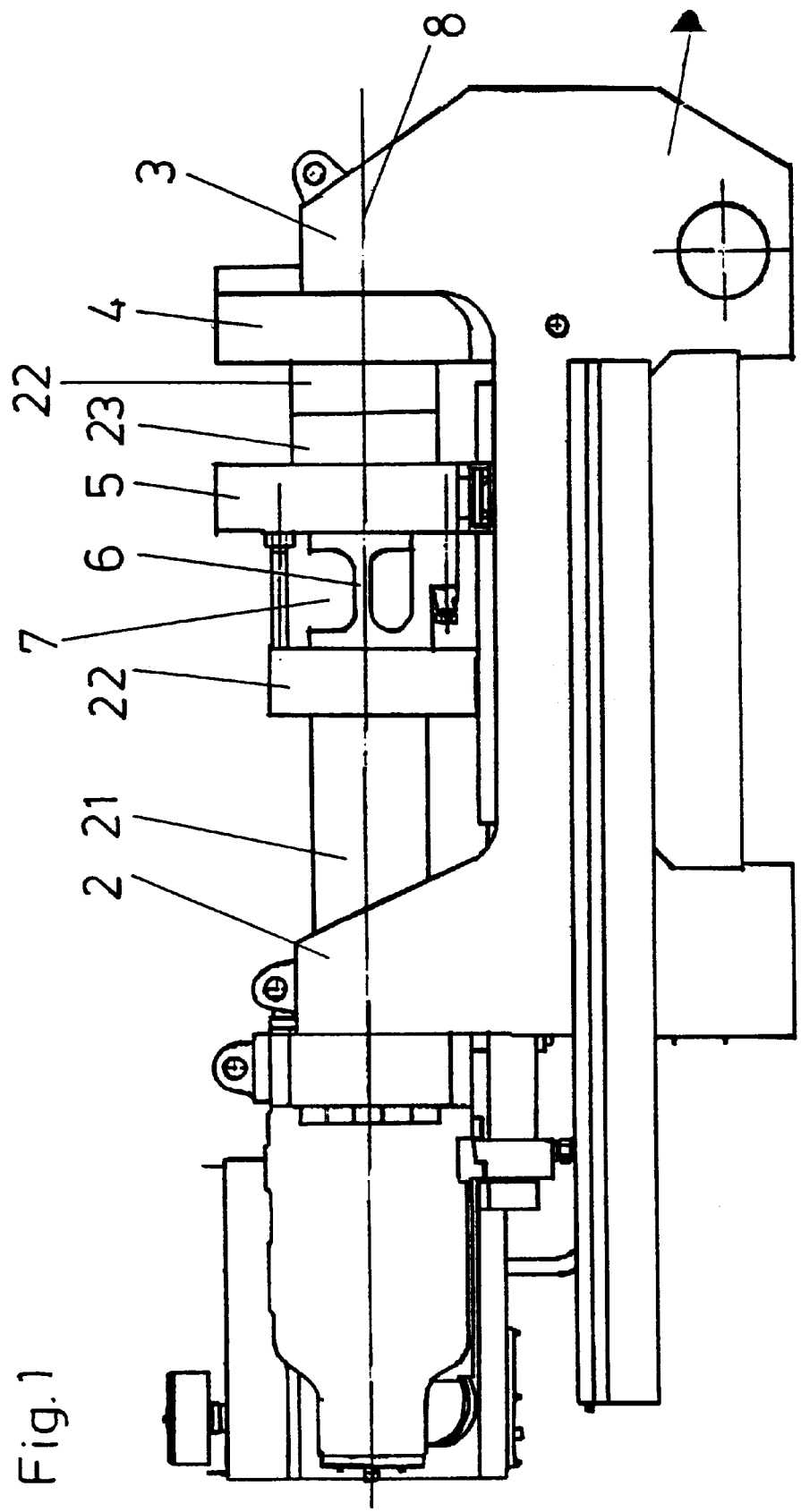
FIG. 1 is a diagrammatic side view of an injection molding machine according to the invention.
Figure 2:
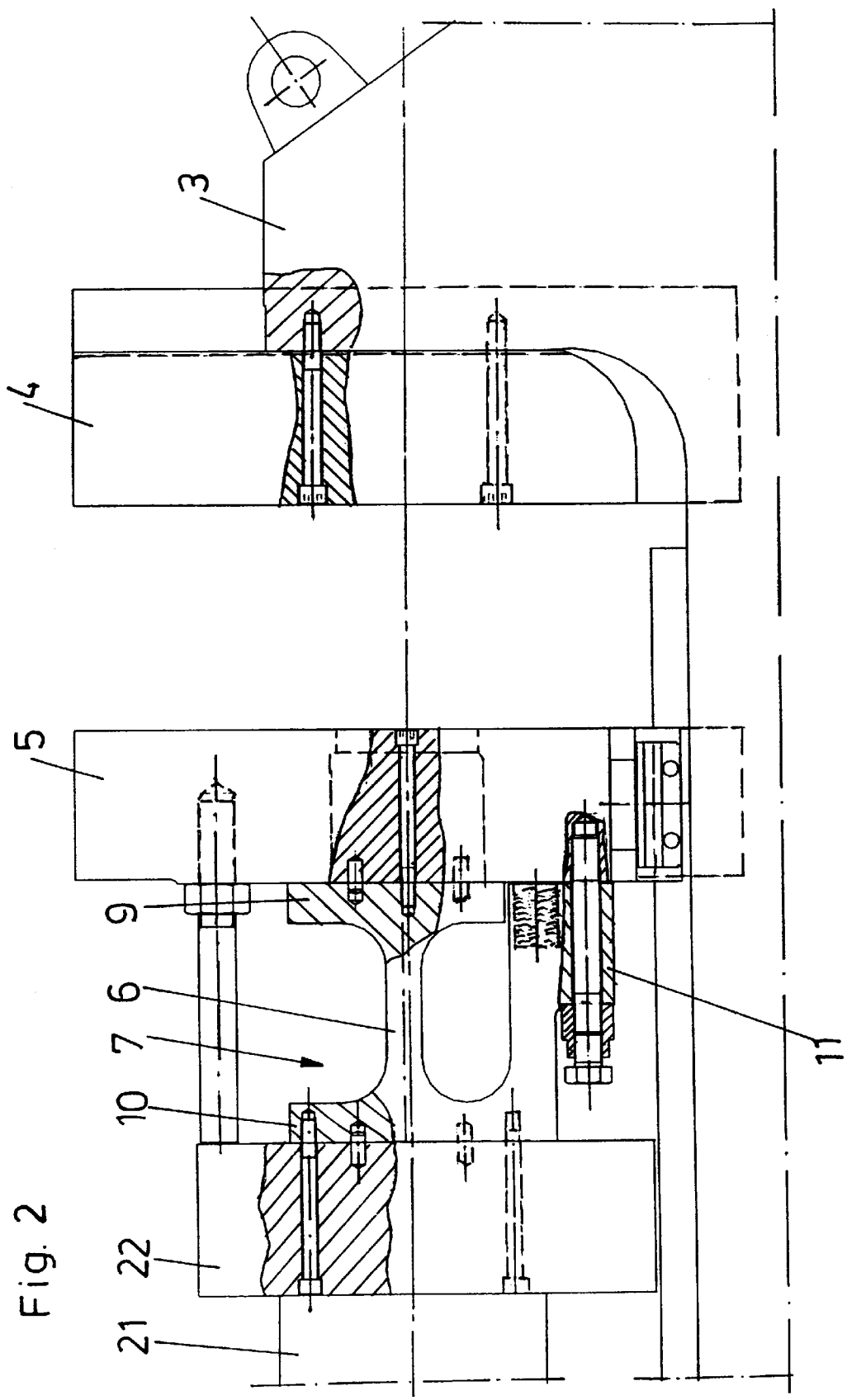
FIG. 2 is a view on an enlarged scale of a detail from FIG. 1.

The injection molding machine shown in FIG. 1 has a machine frame 1 whose particularity is that the upwardly projecting limbs 2 and 3 of the machine frame 1 are not connected by frame beams. Injection of plastic material into the mold which is to be arranged between the stationary mold mounting plate 4 and the movable mold mounting plate 5 is effected by means of an injection unit (not shown) while the mold mounting plates 4, 5 are pressed together by a for example hydraulic closing arrangement. In that situation, the C-shaped machine frame is slightly opened up. In the illustrated embodiment, it is assumed that the mold mounting plate 4 also performs the movement of the limb 3 and a single hinge portion 7 permits a pivotal movement of the mold mounting plate 5 so that the mold mounting plates 4 and 5 remain parallel even under the influence of the closing pressure. The hinge portion 7 which is shown in detail in FIG. 2 comprises a longitudinally directed bar portion 7 whose cross-section forms a horizontal rectangle. The bar portion 6 enlarges continuously in both directions to constitute flanges 9 and 10 which are connected to the adjoining plates 5 and 22. The center line 8 which is defined by the centering devices for the mold halves 22, 23, said centering devices being provided on the mold mounting plates 4, 5, extend entirely in the interior of the bar portion 6 and preferably in slightly displaced relationship into the lower half thereof.

When closing pressure is applied to the closed mold by means of the closing arrangement 21, that pressure is passed through the bar portion 6 which curves upwardly as soon as the mold mounting plates 4 and 5 incline jointly in the clockwise direction. That inclination is limited by an abutment portion 11 which is in one piece with the flange 10 and which bears (see FIG. 3) by way of a plate spring 12 against the mold mounting plate 5. The pivotal movement of the mold mounting plate 5 relative to the rail 19 on which the mold mounting plate 5 is movable by means of a slide shoe is made possible in that case by a resilient connection between the slide shoe 18 and the mold mounting plate 5. In the event of an overload the pivotal movement of the mold mounting plate 5 in the clockwise direction is terminated when the gap 16 is completely closed.

A movement of the mold mounting plate 5 in the counter-clockwise direction, as is possible in particular when the mold is arranged too high, is limited by a counter-portion or check portion 20 which engages behind the abutment portion 11 and which comes to bear against the abutment portion 11 when the gap 17 is closed. That situation occurs in the unloaded condition. The counter-portion 20 comprises a screwthreaded pin 13 which is fixed in the mold mounting plate 5 and which carries an abutment nut 14 fixed by a screw securing means 15.

What is claimed is:

1. An injection molding machine comprising a substantially C-shaped machine frame, on one limb of which is mounted a stationary mold mounting plate and on the other limb of which is mounted a closing mechanism for driving a movable mold mounting plate, wherein the free ends of the limbs of the machine frame, which are not connected by frame beams, deform under the influence of the closing force which occurs during the closing operation, and wherein arranged between at least one mold mounting plate and the machine frame is a hinge portion which includes a bar portion extending in the longitudinal direction of the machine, which hinge portion is deformed when the closing force is applied whereby said at least one mold mounting plate is tilted relative to the associated limb of the machine frame, the cross-section of the hinge portion (7) increasing continuously starting from said bar portion (6).

2. An injection molding machine as set forth in claim 1, wherein the hinge portion includes at least one flange connected to the bar portion, the machine including an abutment portion (11) extending toward the movable mold mounting plate (5) and connected to the flange for engaging the movable mold mounting plate when the movable mold mounting plate tilts toward the abutment portion.

3. An injection molding machine as set forth in claim 2 wherein the abutment portion (11) bears against the moveable mold mounting plate (5) by way of a spring (12).

4. An injection molding machine as set forth in claim 2 wherein the abutment portion (11) co-operates with a counter-portion (20) which is anchored in the movable mold mounting plate (5) and which engages behind the abutment portion (11).

* * * * *

UNITED STATES PATENT AND TRADEMARK OFFICE
CERTIFICATE OF CORRECTION

PATENT NO. : 6,113,383
DATED : September 5, 2000
INVENTOR(S) : OTTO URBANEK AND GERHARD WIMBAUER It is certified that error appears in the above-identified patent and that said Letters Patent is hereby corrected as shown below:

ON THE COVER PAGE OF THE PATENT, LEFT COLUMN, UNDER "[30] FOREIGN APPLICATION PRIORITY DATA,"
CHANGE "96111233" TO --96111233.1-- AND INSERT
--SEPTEMBER 16, 1996 [AT] AUSTRIA ...GM541/96--

Signed and Sealed this

Fifteenth Day of May, 2001

Attest:

NICHOLAS P. GODICI

Attesting Officer     Acting Director of the United States Patent and Trademark Office